(12) United States Patent
Enquist (10) Patent No.: US 9,843,876 B2
(45) Date of Patent: Dec. 12, 2017

(54) AUDIO INTERFACE ARRANGEMENT AND A HANDHELD DEVICE COMPRISING THE AUDIO INTERFACE ARRANGEMENT

(71) Applicant: Zound Industries International AB, Stockholm (SE)

(72) Inventor: Andreas Enquist, Hägersten (SE)

(73) Assignee: Zound Industries International AB, Stockholm (SE)

( * ) Notice: Subject to any disclaimer, the term of this patent is extended or adjusted under 35 U.S.C. 154(b) by 0 days.

(21) Appl. No.: 14/926,313

(22) Filed: Oct. 29, 2015

(65) Prior Publication Data

US 2016/0127844 A1    May 5, 2016

(30) Foreign Application Priority Data

Oct. 30, 2014 (SE) ...................... 1451301

(51) Int. Cl.
*H04R 29/00* (2006.01)
*H04M 1/725* (2006.01)
(Continued)

(52) U.S. Cl.
CPC ............. *H04R 29/00* (2013.01); *G10H 3/186* (2013.01); *H04M 1/72527* (2013.01);
(Continued)

(58) Field of Classification Search
CPC ............. H04R 2420/09; H04R 1/1033; H04R 2420/05; H04R 2499/11; H04R 1/1041;
(Continued)

(56) References Cited

U.S. PATENT DOCUMENTS

2004/0080440 A1    4/2004  Su et al.
2007/0133828 A1    6/2007  Kanji
(Continued)

FOREIGN PATENT DOCUMENTS

EP    2262210 A2    12/2010
EP    2615852 A2    7/2013
GB    2509316 A     7/2014

OTHER PUBLICATIONS

Extended European Search Report, in European App. No. 15192004, dated May 9, 2016.
(Continued)

*Primary Examiner* — Akelaw Teshale
(74) *Attorney, Agent, or Firm* — Knobbe, Martens, Olson & Bear, LLP (57) ABSTRACT

The present disclosure generally relates to an audio interface arrangement. In one embodiment, a handheld device comprises the audio interface arrangement (not shown). The audio interface arrangement comprises at least two audio connecting means, wherein each of the at least two audio connecting means is adapted to connect a respective audio accessory to the audio interface arrangement. The audio interface arrangement further comprises an accessory determining means, which is coupled to said at least two audio connecting means. The accessory determining means is adapted to determine which type of audio accessory is connected to the respective audio connecting means. Hereby it is made possible to provide a handheld device that offers a user with a possibility to connect several different audio accessories to the handheld device, which accessories may be connected to the handheld device at the same time.

17 Claims, 3 Drawing Sheets

(51) Int. Cl.
*G10H 3/18* (2006.01)
*H04S 7/00* (2006.01)

(52) U.S. Cl.
CPC ......... *H04S 7/00* (2013.01); *G10H 2230/015* (2013.01); *H04R 2420/05* (2013.01); *H04R 2499/11* (2013.01); *H04S 2420/01* (2013.01)

(58) Field of Classification Search
CPC .......... H04R 2201/107; H04R 2420/01; H04R 29/00; H04R 5/04; H04R 2420/03; H04R 2420/07; H04R 2430/01; H04R 3/00; H04R 3/007; H04R 3/04; H04R 3/12; H04R 5/033
USPC ... 381/384, 58, 120, 394, 98, 121, 320, 379, 381/57, 74
See application file for complete search history.

(56) References Cited

U.S. PATENT DOCUMENTS

| | | | |
|---|---|---|---|
| 2007/0234880 A1 | 10/2007 | Adams et al. | |
| 2009/0108854 A1* | 4/2009 | Agevik | G06F 13/4072 324/691 |
| 2009/0128235 A1* | 5/2009 | Maenpaa | H03F 1/02 330/127 |
| 2009/0179768 A1* | 7/2009 | Sander | H04M 1/05 340/13.27 |
| 2010/0128900 A1* | 5/2010 | Johnson | H03G 3/001 381/98 |
| 2010/0215183 A1* | 8/2010 | Hansson | H04R 1/1033 381/58 |
| 2011/0099298 A1 | 4/2011 | Chadbourne et al. | |
| 2012/0200172 A1* | 8/2012 | Johnson | H04R 29/001 307/116 |
| 2013/0020882 A1* | 1/2013 | Prentice | H04R 29/004 307/116 |
| 2013/0145057 A1* | 6/2013 | Rathi | G06F 13/4286 710/38 |
| 2014/0038460 A1 | 2/2014 | Lee et al. | |
| 2014/0233741 A1 | 8/2014 | Gustavsson | |
| 2014/0241535 A1* | 8/2014 | Poulsen | H04R 5/04 381/58 |
| 2015/0078577 A1 | 3/2015 | Cimaz et al. | |
| 2016/0094906 A1* | 3/2016 | Keskin | H04R 1/1041 381/74 |

OTHER PUBLICATIONS

International Search Report in Corresponding International Application No. PCT/SE2015/051144, dated Jan. 13, 2016.
Office Action in Swedish Application No. 1451301-4, dated Apr. 22, 2015. (Priority application.).

* cited by examiner

Fig. 1 (existing art)

AUDIO INTERFACE ARRANGEMENT AND A HANDHELD DEVICE COMPRISING THE AUDIO INTERFACE ARRANGEMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to Sweden Patent Application No. 1451301-4, filed Oct. 30, 2014, entitled AN AUDIO INTERFACE ARRANGEMENT AND A HANDHELD DEVICE COMPRISING THE AUDIO INTERFACE ARRANGEMENT, the disclosure of which is incorporated herein by reference in its entirety.

BACKGROUND

Field

The present disclosure generally relates to an audio interface arrangement. More particularly, the present disclosure relates to an audio interface arrangement that may be arranged in a handheld device, such as a tablet computer or a mobile phone (e.g., a smart phone). The disclosure also presents a handheld device comprising an audio interface arrangement.

Description of the Related Art

There is a trend towards providing handheld devices with capacity to deliver an increasing number of services to the users of the handheld devices.

Figure 1:
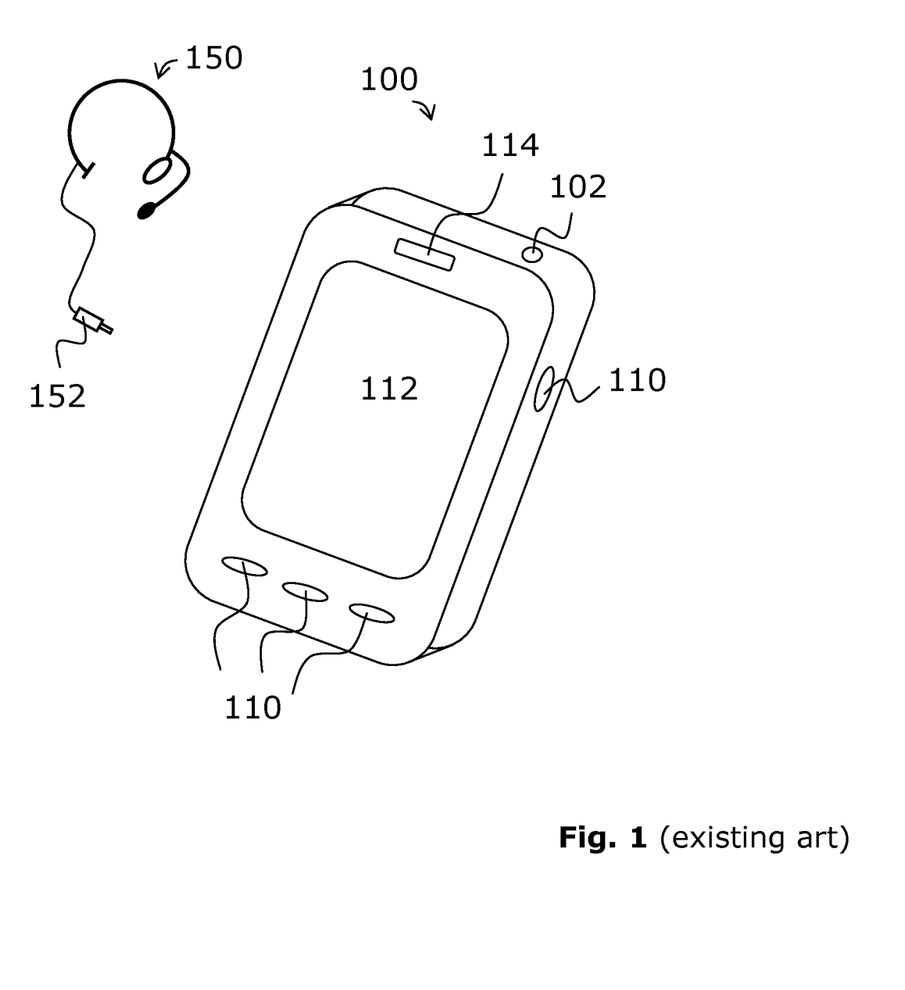
FIG. 1 shows a mobile phone according to the existing art.

Commonly, different categories of users demand various services. In order to adapt handheld devices (e.g., tablet computers, mobile phones, smart phones, personal digital assistants (PDA:s), etc.) to the users' various demands the handheld devices are provided with different applications by which the services are performed. Applications are sometimes commonly referred to as "apps". One example of a handheld device will now be described with reference to FIG. 1. The FIG. 1 is a schematic illustration of a mobile phone 100, which is an example of a handheld device. The mobile phone 100 may comprise a single audio input/output socket 102, a plurality of user control devices 110, a display 112, a loudspeaker 114, and a microphone (not shown).

The socket 102 is typically arranged to enable a user to connect an external input/output accessory, such as a headset 150, to the mobile phone 100 by inserting an audio plug 152 into the socket 102. Typically, the user control devices 110 are implemented as various buttons by which users control or adjust the applications when interacting with the mobile phone 100. Traditionally, the buttons are implemented as push buttons, which the user may press with his/her fingers in order to control a functionality of the mobile phone 100. For instance the user may use a button for navigating in menus in an application, or increasing/decreasing the volume of the sound that is outputted by the loudspeaker 114 during an ongoing phone call.

As users demand more and more services and applications, it becomes a challenge to design flexible and convenient interfaces of the handheld devices.

One example of a new service offered by a mobile phone is disclosed in the Japanese patent application no. JP2007114561A, titled "Mobile Phone-Contained Voice Conversion System" and published on May 10, 2007. JP2007114561A discloses a mobile phone, which provides a Karaoke service to the user of the mobile phone.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods.

It is in view of the above considerations and others that the various embodiments of the present invention have been made.

According to a first aspect, an audio interface arrangement for a handheld device is provided. The audio interface arrangement comprises at least two audio connecting means. Each one of the at least two audio connecting means is adapted to connect a respective audio accessory to the audio interface arrangement, e.g. at the same time. Also, the audio interface arrangement comprises an accessory determining means coupled to the at least two audio connecting means. The accessory determining means is adapted to determine which type of audio accessory that is connected to the respective audio connecting means.

Hereby it is made possible to provide an audio interface arrangement that offers a possibility to connect several different audio accessories to the audio interface arrangement. In other words, the provision of at least two audio connecting means may enable a user to connect a plurality of audio accessories to the audio interface arrangement. Furthermore, by providing an accessory determining means the audio interface arrangement is capable of determining which type of audio accessory/-ies that is/are currently connected to the audio interface arrangement. This contributes to an audio interface arrangement, which is flexible and convenient to utilize for various purposes.

Preferably, but not necessarily, the accessory determining means may be adapted to obtain an electrical impedance value indicative of which type of audio accessory that is connected to the respective audio connecting means. Furthermore, the accessory determining means may be adapted to determine which type of audio accessory that is connected to the respective audio connecting means on the basis of the obtained electrical impedance value.

Advantageously, at least one of the at least two audio connecting means is a socket which is adapted to connect the respective audio accessory by receiving an audio plug of the respective audio accessory.

Preferably, but not necessarily, the socket may be a 3.5 mm (millimeter) socket

Furthermore, a socket may e.g. comprise three or four contact elements.

For example, the audio interface arrangement may be adapted to connect the respective audio accessory as an input audio accessory, such as a microphone or a music instrument, or an output audio accessory, such as headphones or a loudspeaker. Alternatively, the audio interface arrangement may be adapted to connect the respective audio accessory as a combined input and output audio accessory, such as a headset.

In one embodiment, the accessory determining means may be adapted to obtain the impedance value by impedance measurements between two different contact elements of the three or four contact elements. The impedance value between said two different contact elements may be determined at predefined time intervals, such as every 200 milliseconds.

In one embodiment, the audio interface arrangement may comprise an accessory detecting means coupled to said at least two audio connecting means and to the audio accessory determining means. The accessory detecting means may be adapted to detect that an audio accessory is connected to at least one of the audio connecting means. Furthermore, the accessory determining means may be adapted to determine which type of connected audio accessory of one or more audio accessories that is detected by the accessory detecting means. The audio interface arrangement may additionally comprise an accessory control detecting means coupled to the at least two audio connecting means, the accessory control detecting means being adapted to detect that a control means of any one of the connected audio accessories is activated.

According to a second aspect, a handheld device is provided. The handheld device may e.g. be a tablet computer, a mobile phone, a smart phone, or a personal digital assistant, to name a few examples. The handheld device comprises an audio interface means according to the first aspect described hereinabove.

Hereby it is made possible to provide a handheld device, such as a smart phone, that offers a possibility to connect several different audio accessories to the handheld device at the same time. The provision of at least two audio connecting means may enable a user to connect at least two audio accessories to the handheld device. The provision of the accessory determining means further allows for a determination as to which type of audio accessory/-ies that is/are currently connected to the handheld device. This contributes to a handheld device, which is flexible and convenient to utilize for various purposes. For example, the handheld device may meet some of the demands that users demand from their handheld devices.

In some embodiments, the handheld device may further comprise a processing unit adapted to obtain information from the accessory determining means regarding which audio accessory/-ies that is/are connected to the respective audio connecting means. Furthermore, the processing unit may be further adapted to select at least one audio input source and at least one audio output destination based on which audio accessory/-ies that is/are connected to the respective audio connecting means.

In one embodiment, the processing unit may be adapted to obtain the information regarding which audio accessory/-ies that is/are connected to the respective audio connecting means as one of: the impedance value obtained by the accessory determining means; and a digital value representing the type of connected audio accessory.

The information regarding which audio accessory-/-ies that is/are connected may be a digital value representing one of: no audio accessory; guitar; headphone; headset; external loudspeaker; and guitar pedal.

In one embodiment, the processing unit may be adapted to select the at least one audio input source by utilizing an audio routing table. Also, the at least one audio input source may be any one of or any combination of the input sources of the group comprising: internal microphones of the handheld device; a first one of the at least two audio connecting means; and a second one of the at least two audio connecting means.

In one embodiment, the processing unit may be adapted to select the at least one audio output destination by utilizing an audio routing table. Also, the at least one audio output destination may be any one or any combination of output destinations of the group comprising: internal loudspeakers of the handheld device; a first one of the at least two audio connecting means; and a second one of the at least two audio connecting means.

The various embodiments of this disclosure recognize that users demand that more and more services, and/or applications, should be offered by handheld devices. The demanded services, and/or applications, may be of varying complexity.

The various embodiments described herein enables a user to connect several (i.e., at least two) audio accessories to his/her handheld device. As a mere example, a user of a handheld device may connect an electric guitar and headphones to the handheld device at the same time. A user may thus play the guitar and, simultaneously, listen to the thus played guitar music through the headphones. This way, a user of the handheld device may enjoy a new service of his/her handheld device, namely that of the handheld device being (or, forming) a music device for playing and listening to music.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, can be arranged, substituted, combined, and designed in a wide variety of different configurations, all of which are explicitly contemplated and make part of this disclosure. These and other aspects, features and advantages will be apparent and elucidated from the following description of various embodiments, reference being made to the accompanying drawings, in which:

DETAILED DESCRIPTION

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements throughout the description.

Figure 2:
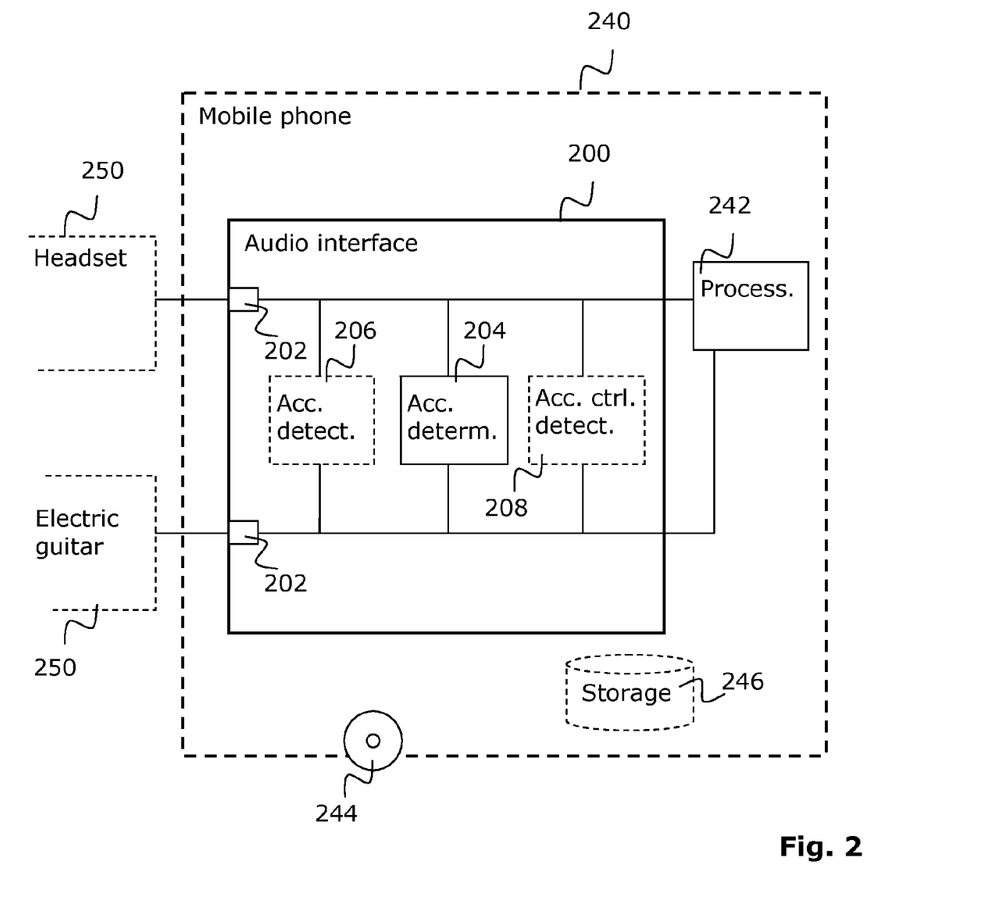
FIG. 2 is a schematic block diagram of an audio interface arrangement in accordance with an example embodiment.

With reference to FIG. 2, an audio interface arrangement 200 will now be described in accordance with an exemplifying embodiment. In the illustrated embodiment, the audio interface arrangement 200 is comprised in a handheld device 240, which is exemplified as a mobile phone.

The audio interface arrangement 200 illustrated in FIG. 2 comprises two audio connecting means 202. The audio interface arrangement 200 is adapted to be arranged in a handheld device 240. Each one of the audio connecting means 202 may be adapted to connect a respective audio accessory 250 to the handheld device 240. It should be appreciated that the audio interface arrangement 200 is not limited to the provision of two audio connecting means 202. As will be appreciated, any suitable number of audio connecting means 202 may be conceivable. In other words, the audio interface arrangement 200 may e.g. comprise three or four audio connecting means 202, etc.

In FIG. 2, a headset and an electric guitar are illustrated as two examples of audio accessories 250. However, any other suitable audio accessory 250 may be utilized when appropriate, such as e.g. headphones, a microphone, a loudspeaker, etc.

The audio interface arrangement 200 also comprises an accessory determining means 204, which is connected to both of the audio connecting means 202. The audio determining means 204 is adapted to determine which type of audio accessory 250 that is connected to the respective audio connecting means 202. For instance, audio accessories such as headsets, headphones, external microphones, external loudspeakers, electric guitars, guitar pedals, etc. may be connected to the audio connecting means 202. In other words, audio input accessories, audio output accessories, as well as combined audio input/output accessories may be connected to the audio connecting means 202. Some examples of audio input accessories are: microphones, electric guitars, guitar pedals, etc. Typical audio output accessories may be external loudspeakers, headphones, etc. A combined audio input/output accessory may for instance be realized as a headset.

In some advantageous embodiments, the accessory determining means 204 is adapted to obtain an electrical impedance value, which is indicative (or, representative) of the type of audio accessory that is connected to the respective audio connecting means 202.

For instance, the electrical impedance value of a certain audio connecting means 202 may be obtained as a resistance value measured between two contact elements of that certain audio connecting means 202. Nevertheless, it should be appreciated that the concept is not limited to the utilization of resistance measurements. Alternatively, the electrical impedance value may instead be obtained as a capacitance value, or an inductance value, which may also be indicative of which type of audio accessory that is connected to the audio connecting means 202.

An example of indicative DC (Direct Current) resistance values of some audio accessory types is shown in the table 1 below.

TABLE 1

Examples of impedance values for different audio accessories (250).

| Accessory type | Accessory DC-resistance (ohm) |
|---|---|
| Headphones | <400 |
| Headsets | 400 ... 5000 |
| Guitar pedal | >5000 |

In some embodiments, the audio connecting means 202 are implemented as sockets which are adapted to receive corresponding plugs (or, audio plugs) of the audio accessories 250 to be connected.

A socket 202 may comprise a suitable number of contact elements which are arranged to connect to corresponding contact elements of the audio plug of an audio accessory 250. By arranging an appropriate number of contact elements, the audio connecting means 202 may be adapted to receive audio plugs and connect to audio accessories of different categories. For instance, when arranging three contact elements, the audio connecting means 202 may connect both input audio accessories and output audio accessories. Alternatively, when arranging four contact elements, the audio connecting means may in addition also connect to combined input/output audio accessories, e.g. headsets.

A socket may e.g. be implemented as a 3.5 mm audio socket which is arranged to receive a corresponding 3.5 mm (millimeter) audio plug of an appropriate audio accessory 250.

In some embodiments, the accessory determining means 204 is adapted to perform repeated measurements of the electrical impedance value. This functionality is sometimes referred to as so SW-polling (or, Software-polling). For example, by setting an appropriate time interval between the measurements, e.g. 200 ms (milliseconds), the accessory determining means 204 may notice when an audio accessory 250 is being connected or disconnected almost at the same time as when the connection or disconnection occurs. The accessory determining means 204 may then inform the handheld device 240 that a change of audio accessory 250 has occurred. In this context, a change should be interpreted as also comprising actions of connecting or disconnecting the audio accessory 250.

In some embodiments, the audio interface arrangement 200 further comprises an accessory detecting means 206. The accessory detecting means 206 may be connected to both of the audio connecting means 202 and is adapted to detect when an audio accessory 250 is connected to any one of the audio connecting means 202, and also to detect when an audio accessory 250 is released from the audio connecting means 202. The accessory detecting means 206 may e.g. be adapted to detect that a DC (Direct Current)-level of an electrical signal of the connecting means 202 is changed. For example, the accessory detecting means 206 may be adapted to detect that a DC-level of an electrical signal of the connecting means 202 is changed by comparing the DC-level with a specific DC-level which is indicative of a connected audio accessory 250. By arranging the accessory detecting means 206 in the audio interface arrangement 200, the accessory determining means 204 may be activated only when the accessory detecting means 206 indicates that a change of audio accessories 250 takes place. Thereby, the above described SW-polling may optionally be omitted from the accessory determining means 204. This may make the design of the accessory determining means 204 less complex. In addition, because the accessory determining means 204 will only be activated when the accessory detecting means 206 detects a change, the power consumption of the accessory determining means 204 may be reduced.

It is also to be noted that the accessory detecting means 206 may be implemented in different ways. For instance, the accessory detecting means 206 may be implemented as a mechanical switch. If so, the mechanical switch may be arranged, i.e. positioned, within the audio connecting means 202. Insertion of a corresponding audio plug into the audio connecting means 202 may then activate the mechanical switch in such way that it can be detected that the audio accessory 250 is connected. Correspondingly, removal of the audio plug from the audio connecting means 202 will result in that the mechanical switch is deactivated, such that the disconnection (i.e. releasing) of the audio accessory 250 can be detected.

In addition, the audio interface arrangement 200 may optionally also be equipped with an accessory control detecting means 208. The accessory control detecting means 208 is adapted to detect whether a control means of a connected audio accessory is activated. For instance, the audio interface arrangement means 200 may detect: that a button of a microphone is pressed, that a volume control knob is adjusted, or that a guitar pedal is pressed down, etc. The accessory control detecting means 208 may be connected to both the audio connecting means 202. For each one of the audio connecting means 202, the accessory control detecting means 208 may be adapted to measure an impedance value between two different contact elements of that audio connecting means 202. Table 2 below illustrates examples of typical resistance values of different audio accessory controls.

TABLE 2

Examples of impedance values for different buttons.

| Button type | Button DC-resistance (ohm) | Tolerance % |
|---|---|---|
| Headset, send/end button | <70 | — |
| Guitar pedal, button # 1 | 150 | 5% |
| Guitar pedal, button # 2 | 270 | 5% |

In the above described exemplifying embodiments, the audio connecting means 202 of the audio interface arrangement 200 are connected to a processing unit 242 of a mobile phone 240.

The mobile phone 240 may thus be capable of receiving an audio input signal from an audio accessory 250, processing and/or converting the received audio input signal into an audio output signal which is sent to another audio accessory 250.

With continued reference to FIG. 2, a handheld device 240 which comprises the audio interface arrangement 200 of any above described embodiments will now be schematically described in accordance with an exemplifying embodiment. The handheld device of this embodiment is implemented as a mobile phone 240.

The mobile phone 240 comprises the audio interface arrangement 200 described hereinabove and a processing unit 242. The audio interface arrangement 200 has been described above and will therefore not be further discussed herein.

In addition, the mobile phone 240 typically comprises further components or units which are arranged to provide ordinary functionality to the mobile phone 240. To this end, the mobile phone 240 may comprise components such as a display (e.g. a touch-sensitive display), an internal microphone, an internal loudspeaker, various user controls, processors, and storage units (e.g. memory), etc. In FIG. 2, only some of these components have been schematically illustrated (e.g. a users control in the form of a scroll wheel 244 and a storage unit 246).

The accessory determining means 204 is connected to the processing unit 242. The processing unit 242 may be adapted to obtain information from the accessory determining means 204 regarding which type of audio accessory 250 that is connected to the respective audio connecting means 202. Also, the processing unit 242 may additionally be connected to any one or both of the accessory detecting means 206 and the accessory control detecting means 208. In addition, the processing unit 242 may be adapted to obtain information regarding whether any control means of the connected audio accessories are activated.

The processing unit 242 may be adapted to control the audio connecting means 202 according to an audio routing table. An example of such an audio routing table is shown in Table 3 below.

In the audio routing table of Table 3, AC1 represents a first one of the audio connecting means 202 and AC2 a second one of the audio connecting means 202. As stated above, the processing unit 242 is adapted to select an audio input source and/or an audio output destination based on which type of audio accessories 250 that are connected to the respective audio connecting means 202.

TABLE 3

Example of audio routing table.

| AC1 | AC2 | Audio input source | Audio output destination |
|---|---|---|---|
| Empty | Empty | Internal microphones | Internal speakers |
| Empty | Guitar | AC2 (mono) | Internal speakers |
| Empty | Headphone | Internal microphones | AC2 |
| Empty | Headset | AC2 (mono) | AC2 |
| Guitar | Empty | AC1 (mono) | Internal speakers |
| Guitar | Guitar | AC1 + AC2 | Internal speakers |
| Guitar | Headphone | AC1 | AC2 |
| Guitar | Headset | AC1 + AC2 | AC2 |
| Headphone | Empty | Internal microphones | AC1 |
| Headphone | Guitar | AC2 (mono) | AC1 |
| Headphone | Headphone | Internal microphones | AC1 and AC2 |
| Headphone | Headset | AC2 (mono) | AC1 and AC2 |
| Headset | Empty | AC1 (mono) | AC1 |
| Headset | Guitar | AC1 + AC2 | AC1 |
| Headset | Headphone | AC1 (mono) | AC1 and AC2 |
| Headset | Headset | AC1 + AC2 (Cellular call only AC1) | AC1 and AC2 |

For instance, as seen in the first row, when no audio accessories 250 are connected to any of the audio connecting means AC1, AC2 (202), the processing unit 242 may select internal microphones and internal speakers (also known as loudspeakers) in accordance with the audio routing table.

As seen in the eighth row, when an electric guitar is connected to the first audio connecting means AC1 (202) and a headset is connected to the second audio connecting means AC2 (202), the processing unit 242 may be adapted to select both the guitar and the microphone of the headset as audio input source, and the loudspeaker of the headset as audio output destination. A user who is playing the guitar and is wearing the headset can then input audio signals from the guitar as well as audio signals from the microphone of the headset into the mobile phone. The user may also listen to outputted audio signals from the mobile phone through the loudspeakers of the headset. When the user, instead, wants to mute the microphone of the headset, he/she may press a mute button on the headset. The above described accessory control detecting means 208 may detect that the mute button is activated and the control unit 242 may be operable to mute the microphone of the headset accordingly.

It is to be noted that even if this exemplifying embodiment describes a mobile phone 240, the herein described concept is not limited to mobile phones. The audio interface arrangement 200 may be arranged in other types of handheld devices when appropriate, such as in PDAs, tablet computers, etc.

Figure 3:
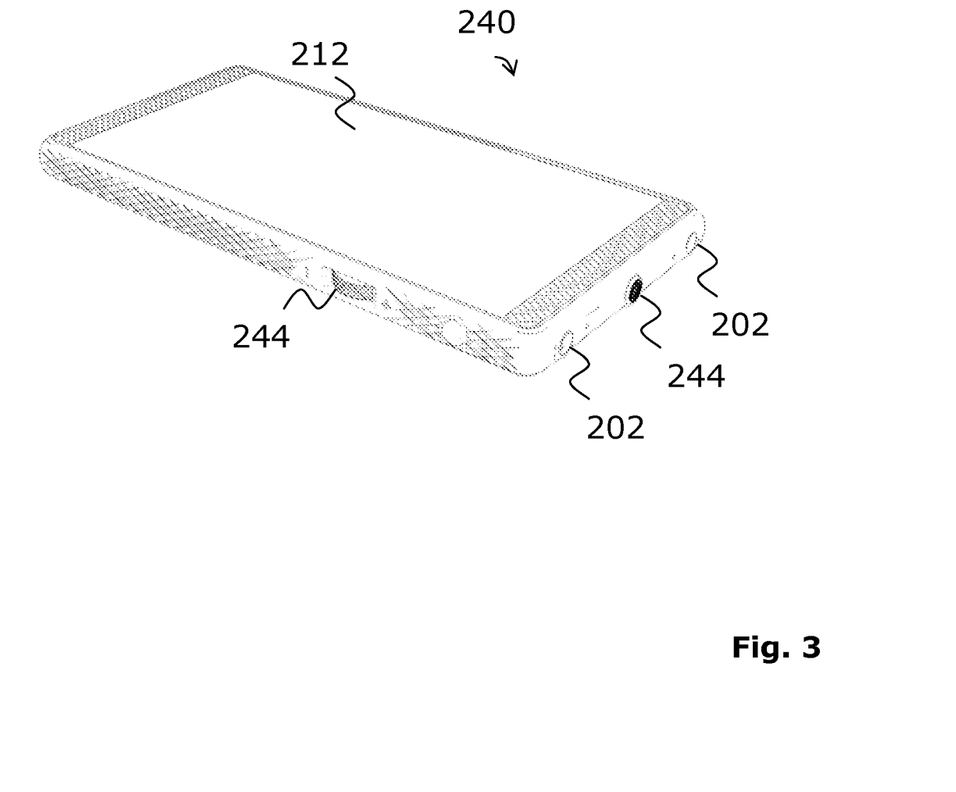
FIG. 3 shows an example embodiment of a handheld device which comprises the audio interface arrangement shown in FIG. 2.

With reference to FIG. 3, an example embodiment of a mobile phone 240 will be briefly described. The mobile phone 240 corresponds to the mobile phone 240 of the embodiment described in conjunction with FIG. 2. Like reference numbers therefore refer to like elements throughout the following description with reference to FIG. 3.

In this embodiment, the mobile phone 240 comprises two audio connecting means 202, two user control means 244, and a display 212. The two audio connecting means 202 are arranged at an audio interface arrangement (not shown) which is adapted to detect which type of audio accessory (not shown) that is connected to the respective audio connecting means 202. The audio interface arrangement has been described above and will therefore not be described further.

The mobile phone 240 is adapted to select one of the audio connecting means 202 as audio input source and the other audio connecting means 202 as audio output destination according to an audio routing table. Also, the audio routing table has been described hereinabove and will therefore not be described in further detail.

In this embodiment, the audio connecting means 202 are implemented as 3.5 mm audio sockets, having four contact elements each. Thereby the mobile phone 240 may utilize both the audio connecting means 202 as any of: audio input means, audio output means, and combined audio input/output means.

Again, it is worth emphasizing that the disclosed concept is not limited to utilizing 3.5 mm audio sockets as audio connecting means. The mobile phone 240 may be designed with other types of audio sockets (or audio plugs) with three or four contact elements as appropriate, e.g. 6.3 mm audio sockets with three contact elements. As will be appreciated by those skilled in the art, it would be possible to arrange any suitable combination of appropriate audio connecting means, e.g. one 3.5 mm socket and one so called Lightning socket or, alternatively, one USB (Universal Serial Bus) socket. For instance, appropriate types of audio connecting means may be selected from a list of: 3.5 mm (⅛ Inch), 2.5 mm, 6.3 mm (¼ Inch), Lightning, Micro-USB, Mini-USB, D-shaped 3.5 mm, etc.

The various embodiments that have been described hereinabove recognize that users demand that more and more services, and/or applications, should be offered by handheld devices, such as mobile phones 240. The various embodiments described herein enables a user to connect several (i.e., at least two) audio accessories 250 to his/her mobile phone 240. As a mere example, a user of the mobile phone 240 described in connection with FIGS. 2 and 3 may connect an electric guitar 250 as well as headphones 250 to the mobile phone 240 at the same time. A user may thus play the guitar 250 and, simultaneously, listen to the thus played guitar music through the headphones 250. This way, a user of the mobile phone 240 may enjoy a new service of his/her mobile phone 240, namely that of the mobile phone 240 being a music device for playing and listening to music played by means of the electric guitar 250.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims (or embodiments), these may possibly advantageously be combined, and the inclusion of different claims (or embodiments) does not imply that a combination of features is not feasible and/or advantageous. In addition, singular references do not exclude a plurality. Finally, reference signs in the claims are provided merely as a clarifying example and should not be construed as limiting the scope of the claims in any way.

Selected example embodiments described herein

The technology described in this disclosure thus encompasses without limitation the following Numbered Example Embodiments (NEE's):

NEE1. An audio interface arrangement (200) for a handheld device (240), characterized in that the audio interface arrangement (200) comprises: at least two audio connecting means (202), wherein each of the at least two audio connecting means (202) is adapted to connect a respective audio accessory (250) to the audio interface arrangement (200), and an accessory determining means (204) coupled to said at least two audio connecting means (202), wherein the accessory determining means (204) is adapted to determine which type of audio accessory (250) that is connected to the respective audio connecting means (202).

NEE2. The audio interface arrangement (200) according to NEE1, wherein the accessory determining means (204) is adapted to obtain an electrical impedance value indicative of which type of audio accessory that is connected to the respective audio connecting means (202), and wherein the accessory determining means (204) is adapted to determine which type of audio accessory (250) that is connected to the respective audio connecting means (202) on the basis of the obtained electrical impedance value.

NEE3. The audio interface arrangement (200) according to NEE1 or NEE2, wherein at least one of the at least two audio connecting means (202) is a socket which is adapted to connect the respective audio accessory (250) by receiving an audio plug of the respective audio accessory (250).

NEE4. The audio interface arrangement (200) according to NEE3, wherein the socket comprises three contact elements, and the audio interface arrangement (200) is adapted to connect the respective audio accessory (250), as an input audio accessory, such as a microphone or a music instrument, or an output audio accessory, such as headphones or a loudspeaker.

NEE5. The audio interface arrangement (200) according to NEE3, wherein the socket comprises four contact elements, and the audio interface arrangement (200) is adapted to connect the respective audio accessory (250) as a combined input and output audio accessory, such as a headset.

NEE6. The audio interface arrangement (200) according to any one of the NEEs NEE3-NEE5, wherein the socket is a 3.5 millimeter socket.

NEE7. The audio interface arrangement (200) according to any one of NEEs NEE4-NEE6 when dependent on NEE 2, wherein the accessory determining means (204) is further adapted to obtain the impedance value by impedance measurements between two different contact elements of the three or four contact elements.

NEE8. The audio interface arrangement (200) according to NEE7, wherein the accessory determining means (204) is adapted to obtain the impedance value between said two different contact elements at predefined time intervals, such as every 200 milliseconds.

NEE9. The audio interface arrangement (200) according to any one of the NEEs NEE1-NEE8, further comprising: an accessory detecting means (206) coupled to said at least two audio connecting means (202) and to the audio accessory determining means (204), the accessory detecting means (206) being adapted to detect that an audio accessory (250) is connected to at least one of the audio connecting means (202), and wherein the accessory determining means (204) is adapted to determine which type of connected audio accessory (250) that is detected by the accessory detecting means (206).

NEE10. The audio interface arrangement (200) according to any one of the NEEs, further comprising an accessory control detecting means (208) coupled to the at least two audio connecting means (202), the accessory control detecting means (208) being adapted to detect that a control means of any one of the connected audio accessories (250) is activated.

NEE11. A handheld device (240), characterized in that it comprises the audio interface arrangement (200) according to any one of the NEEs 1-10.

NEE12. The handheld device (240) according to NEE11, wherein the handheld device (240) further comprises a processing unit (242) adapted to obtain information from the accessory determining means (204) regarding which audio accessory/-ies (250) that is/are connected to the respective audio connecting means (202), the processing unit (242) further being adapted to select at least one audio input source and at least one audio output destination based on which audio accessories (250) that is/are connected to the respective audio connecting means (202).

NEE13. The handheld device (240) according to NEE12, wherein the processing unit (242) is adapted to obtain the information regarding which audio accessories (250) that is/are connected to the respective audio connecting means as one of: the impedance value obtained by the accessory determining means (204); and a digital value representing the type of connected audio accessory (250).

NEE14. The handheld device (240) according to NEE12 or NEE13, wherein the information regarding which audio accessories (250) that is/are connected is a digital value representing one of: no audio accessory; a guitar; a headphone; a headset; an external loudspeaker; and a guitar pedal.

NEE15. The handheld device (240) according to NEE12 or NEE13, wherein the processing unit (242) is adapted to select the at least one audio input source by utilizing an audio routing table and the at least one audio input source is/are any one of or any combination of the input sources of the group comprising: internal microphones of the handheld device (240); a first one of the at least two audio connecting means (202); and a second one of the at least two audio connecting means (202).

NEE16. The handheld device (240) according to NEE12 or NEE13, wherein the processing unit (242) is adapted to select the at least one audio output destination by utilizing an audio routing table and the at least one audio output destination is/are any one or any combination of output destinations of the group comprising: internal loudspeakers of the handheld device (240); a first one of the at least two audio connecting means (202); and a second one of the at least two audio connecting means (202).

NEE17. The handheld device (240) according to any one of the NEEs NEE11-NEE16, wherein the handheld device (240) is any one of the devices of the group comprising: a tablet computer, a mobile phone, a smart phone, and a personal digital assistant.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the figures may be combined, interchanged or excluded from other embodiments.

The processes described and/or shown herein are illustrative only. A person of skill in the art will understand that the steps, decisions, and processes described herein may be performed in an order other than that described herein. Thus, the particular descriptions are not intended to limit the associated processes to being performed in the specific order described.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. An audio interface arrangement for a handheld device, the audio interface arrangement comprising:
    at least two audio connecting means, wherein each of the at least two audio connecting means is adapted to connect a respective audio accessory to the audio interface arrangement, at the same time, and
    an accessory determining means coupled to said at least two audio connecting means, wherein the accessory determining means is adapted to determine which type of audio accessory is connected to the respective audio connecting means when each of the at least two audio connecting means connects a respective audio accessory to the audio interface arrangement, at the same time,
    wherein the accessory determining means is adapted to obtain an electrical impedance value indicative of which type of audio accessory is connected to the respective audio connecting means, and wherein the accessory determining means is adapted to determine which type of audio accessory is connected to the respective audio connecting means on the basis of the obtained electrical impedance value.

2. The audio interface arrangement according to claim 1, wherein at least one of the at least two audio connecting means is a socket which is adapted to connect the respective audio accessory by receiving an audio plug of the respective audio accessory.

3. The audio interface arrangement according to claim 2, wherein the socket comprises three contact elements, and the audio interface arrangement is adapted to connect the respective audio accessory as an input audio accessory or an output audio accessory.

4. The audio interface arrangement according to claim 2, wherein the socket comprises four contact elements, and the audio interface arrangement is adapted to connect the respective audio accessory as a combined input and output audio accessory.

5. The audio interface arrangement according to claim 2, wherein the socket is a 3.5 millimeter socket.

6. The audio interface arrangement according to claim 1, wherein at least one of the at least two audio connecting means is a socket which is adapted to connect the respective audio accessory by receiving an audio plug of the respective audio accessory, wherein the socket comprises three contact elements and the audio interface arrangement is adapted to connect the respective audio accessory as an input audio accessory or an output audio accessory, and wherein the accessory determining means is further adapted to obtain the impedance value by impedance measurements between two different contact elements of the three contact elements.

7. The audio interface arrangement according to claim 6, wherein the accessory determining means is adapted to obtain the impedance value between said two different contact elements at one or more predefined time intervals.

8. The audio interface arrangement according to claim 1, further comprising an accessory detecting means coupled to said at least two audio connecting means and to the audio accessory determining means, the accessory detecting means being adapted to detect that an audio accessory is connected to at least one of the audio connecting means, and wherein the accessory determining means is adapted to determine which type of connected audio accessory is detected by the accessory detecting means.

9. The audio interface arrangement according to claim 1, further comprising an accessory control detecting means coupled to the at least two audio connecting means, the accessory control detecting means being adapted to detect that a control means of any one of the connected audio accessories is activated.

10. A handheld device comprising the audio interface arrangement according to claim 1.

11. The handheld device according to claim 10, wherein the handheld device further comprises a processing unit adapted to obtain information from the accessory determining means regarding which audio accessory is connected to the respective audio connecting means, the processing unit further being adapted to select at least one audio input source and at least one audio output destination based on which audio accessory is connected to the respective audio connecting means.

12. The handheld device according to claim 11, wherein the processing unit is adapted to obtain the information regarding which audio accessory is connected to the respective audio connecting means as i) the impedance value obtained by the accessory determining means or ii) a digital value representing the type of connected audio accessory.

13. The handheld device according to claim 11, wherein the information regarding which audio accessory is connected is a digital value representing one of the following: no audio accessory; a guitar; a headphone; a headset; an external loudspeaker; or a guitar pedal.

14. The handheld device according to claim 11, wherein the processing unit is adapted to select the at least one audio input source by utilizing an audio routing table and the at least one audio input source is any one of or any combination of the input sources of the group comprising: internal microphones of the handheld device; a first one of the at least two audio connecting means; and a second one of the at least two audio connecting means.

15. The handheld device according to claim 11, wherein the processing unit is adapted to select the at least one audio output destination by utilizing an audio routing table and the at least one audio output destination is any one or any combination of output destinations of the group comprising: internal loudspeakers of the handheld device; a first one of the at least two audio connecting means; and a second one of the at least two audio connecting means.

16. The handheld device according to claim 10, wherein the handheld device is any one of the devices of the group comprising: a tablet computer, a mobile phone, a smart phone, and a personal digital assistant.

17. The audio interface arrangement according to claim 1, wherein the respective audio accessory is a guitar, a headphone, a headset, an external loudspeaker, or a guitar pedal.

* * * * *